(12) United States Patent
Yamanouchi

(10) Patent No.: US 7,244,033 B2
(45) Date of Patent: Jul. 17, 2007

(54) MOISTUREPROOF OPTICAL DEVICE

(75) Inventor: Haruhiko Yamanouchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 130 days.

(21) Appl. No.: 11/113,894

(22) Filed: Apr. 25, 2005

(65) Prior Publication Data
US 2005/0237613 A1   Oct. 27, 2005

(30) Foreign Application Priority Data

Apr. 26, 2004 (JP) ............................ 2004-129965
Feb. 17, 2005 (JP) ............................ 2005-040677

(51) Int. Cl.
*G02B 23/16* (2006.01)
(52) U.S. Cl. .................. 359/513; 359/507; 359/512
(58) Field of Classification Search ................ 359/513
See application file for complete search history.

(56) References Cited

U.S. PATENT DOCUMENTS

| | | | |
|---|---|---|---|
| 4,737,017 A * | 4/1988 | Nagasaka ................ 359/811 |
| 4,755,031 A * | 7/1988 | Daviau et al. ............ 359/512 |
| 5,677,789 A | 10/1997 | Funatsu |
| 5,754,339 A * | 5/1998 | Kanai et al. ............. 359/557 |
| 5,883,738 A | 3/1999 | Funatsu |
| 6,075,114 A * | 6/2000 | Umetsu et al. ........... 528/272 |
| 6,108,128 A * | 8/2000 | Funatsu .................. 359/407 |
| 6,191,888 B1 * | 2/2001 | Yamanouchi ............. 359/557 |
| 6,193,379 B1 * | 2/2001 | Tonar et al. ............. 359/603 |
| 6,759,590 B2 * | 7/2004 | Stark ...................... 174/539 |
| 6,793,713 B2 * | 9/2004 | Kretsinger et al. ......... 95/117 |
| 2002/0122302 A1 * | 9/2002 | Palmer .................... 361/752 |
| 2004/0238371 A1 * | 12/2004 | Franz ..................... 205/187 |

FOREIGN PATENT DOCUMENTS

| | | |
|---|---|---|
| JP | 07-56077 A | 3/1995 |
| JP | 2002-122929 A | 4/2002 |
| JP | 2003-172860 A | 6/2003 |

\* cited by examiner

*Primary Examiner*—Ricky Mack
*Assistant Examiner*—Michael P Roberts
(74) *Attorney, Agent, or Firm*—Canon U.S.A. Inc I.P. Div

(57) ABSTRACT

An optical device includes a first optical element including an incidence plane on which light from an object is incident, the incidence plane being in contact with the surrounding environment; a main body having an inside and housing the first optical element such that the incidence plane and the inside of the main body are hermetically sealed; a second optical element provided in the main body, the second optical element receiving light from the first optical element; and an absorbent member provided in the main body. In the optical device, the absorbent member has a moisture absorptive capacity corresponding to at least an amount of water retention inside the main body.

5 Claims, 6 Drawing Sheets

MOISTUREPROOF OPTICAL DEVICE

BACKGROUND OF THE INVENTION

1. Field of the Invention

The present invention relates to an optical device such as monoculars and binoculars.

2. Description of the Related Art

In general, hermetically sealed waterproof optical devices, for example, an underwater camera disclosed in Japanese Patent Laid-Open No. 2002-122929, include a transparent housing or a transparent window. Needless to say, such waterproof optical devices must prevent water from entering inside. In view of their applications, for example, the use of such optical devices at low temperature causes fogging due to condensation of water vapors. In such a case, the main function serving as optical devices including the above transparent portion is impaired. Therefore, the water vapor pressure inside of optical devices must be controlled so as to not exceed a predetermined value at any given time.

Hitherto, in addition to the above underwater camera, for example, waterproof binoculars are known as hermetically sealed waterproof optical devices. For example, Japanese Patent Laid-Open No. 7-209589 (corresponding to U.S. Pat. Nos. 5,677,789 and 5,883,738) discloses such waterproof binoculars.

Such waterproof binoculars generally have exterior parts composed of a metal such as aluminum or a magnesium alloy to prevent the permeation of moisture (including water vapors). In addition, an inert gas such as nitrogen is filled in the waterproof binoculars in order to remove air containing water vapors due to the environment in the assembly process. In some recent waterproof binoculars having an image stabilizer, the exterior parts are composed of a resin.

Regarding underwater cameras, it generally suffices to achieve the waterproofing only when the underwater cameras are actually used in water. Subsequently, water vapors and water droplets can be removed when a back cover is opened in order to replace a roll of film. Therefore, the permeability of water vapors need not be considered. This is also true of optical devices such as digital cameras using an additional underwater housing, that is, a hermetically sealed casing having a transparent window for the purpose of use in water.

Regarding the above known hermetically sealed optical devices, in particular, since users barely perform any maintenance after using the devices, the water vapor content in the devices must be constantly low, and in addition, a reasonable moistureproof structure must be provided. According to the moistureproof structure of the known hermetically sealed optical devices, as described above, the exterior parts composed of a metal can provide an excellent gas barrier property and high strength. However, in terms of low cost and weight reduction, such a moistureproof structure is not necessarily satisfactory, and thus preventing the popularization to the public.

Even when the optical devices include exterior parts that are composed of a metal and provide the excellent gas barrier property, the following phenomenon prevents the improvement in moistureproof performance. The use of a water retention material inside the devices generates water vapor as time goes on. In such a case, as will be clearly described in calculation examples below, the presence of a large amount of water vapors, which significantly exceeds the saturated water vapor at a low temperature, must be accepted.

Furthermore, for example, waterproof binoculars with an image stabilizer including exterior parts composed of a resin instead of a metal have a low gas barrier property. Unfortunately, after such waterproof binoculars are used, the waterproof performance is deteriorated over a short term. In addition, a large apparatus is required for filling inert gas such as nitrogen. Therefore, a place where, for example, the maintenance can be performed is limited.

SUMMARY OF THE INVENTION

The present invention is directed to a light-weight and low-cost moistureproof optical device that allows for simple maintenance.

According to an aspect of the present invention, an optical device includes a first optical element including an incidence plane on which light from an object is incident, the incidence plane being in contact with the surrounding environment; a main body having an inside and housing the first optical element such that the incidence plane of the first optical element and the inside of the main body are hermetically sealed; a second optical element provided in the main body, the second optical element receiving light from the first optical element; and an absorbent member provided in the main body, wherein the absorbent member has a moisture absorptive capacity corresponding to at least an amount of water retention inside the main body.

According to another aspect of the present invention, an optical device includes a pair of right and left optical paths; a pair of right and left first optical elements including incidence planes on which light from an object is incident, the incidence planes being in contact with the surrounding environment; a main body having an inside; a pair of right and left second optical elements provided in the main body, the second optical elements receiving light from the corresponding first optical elements; a pair of right and left third optical elements including emission planes being in contact with the surrounding environment, the third optical elements receiving light passing through the corresponding first and second optical elements and emitting the light from the emission planes; and an absorbent member provided in the main body. The main body houses each of the pair of right and left first optical elements such that the incidence planes of the first optical elements and the inside of the main body are hermetically sealed. The main body also houses each of the pair of right and left third optical elements such that the emission planes of the third optical elements and the inside of the main body are hermetically sealed. The absorbent member has a moisture absorptive capacity corresponding to at least an amount of water retention inside the main body.

In the above optical device, the absorbent member can have a moisture absorptive capacity of at least double the amount of water retention inside the main body. The main body can be composed of a synthetic resin, and an exterior surface of the main body can include a gas barrier layer. The gas barrier layer can be a plated layer. The absorbent member can have a moisture absorptive capacity corresponding to at least an amount of water retention inside the gas barrier layer. Furthermore, the main body can be composed of a metal. The above optical device can be a pair of binoculars. The optical device can include a mechanism for compensating motion blurring. The binoculars can include a mechanism for compensating motion blurring. Furthermore, two absorbent members can be provided inside the main body.

Further features and advantages of the present invention will become apparent from the following description of exemplary embodiments with reference to the attached drawings.

DESCRIPTION OF THE EMBODIMENTS

Embodiments of the present invention will now be described with reference to the drawings.

First Embodiment

Figure 1:
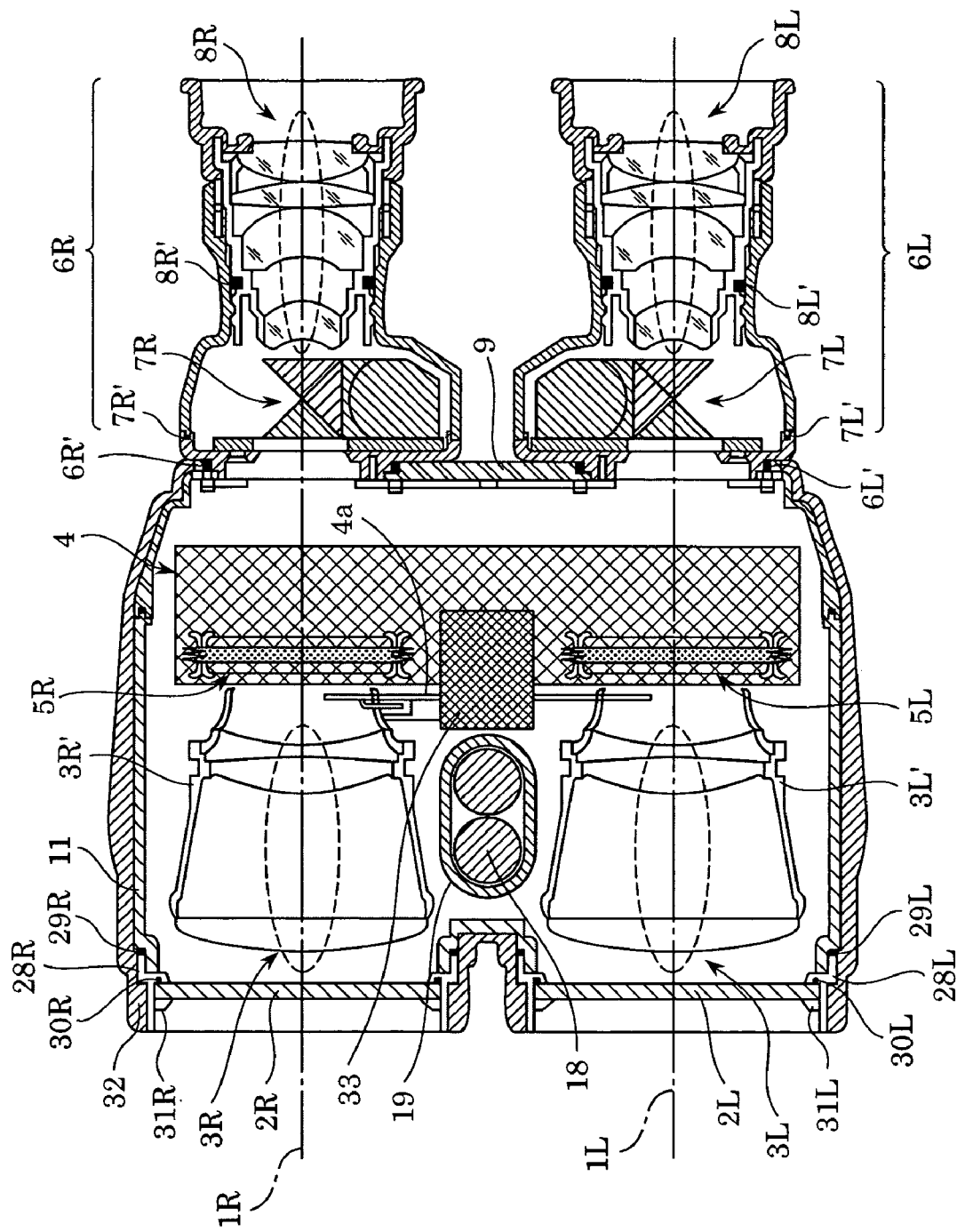
FIG. 1 is a horizontal sectional view of a pair of hermetically sealed binoculars according to a first embodiment of the present invention, viewed from above.
Figure 2:
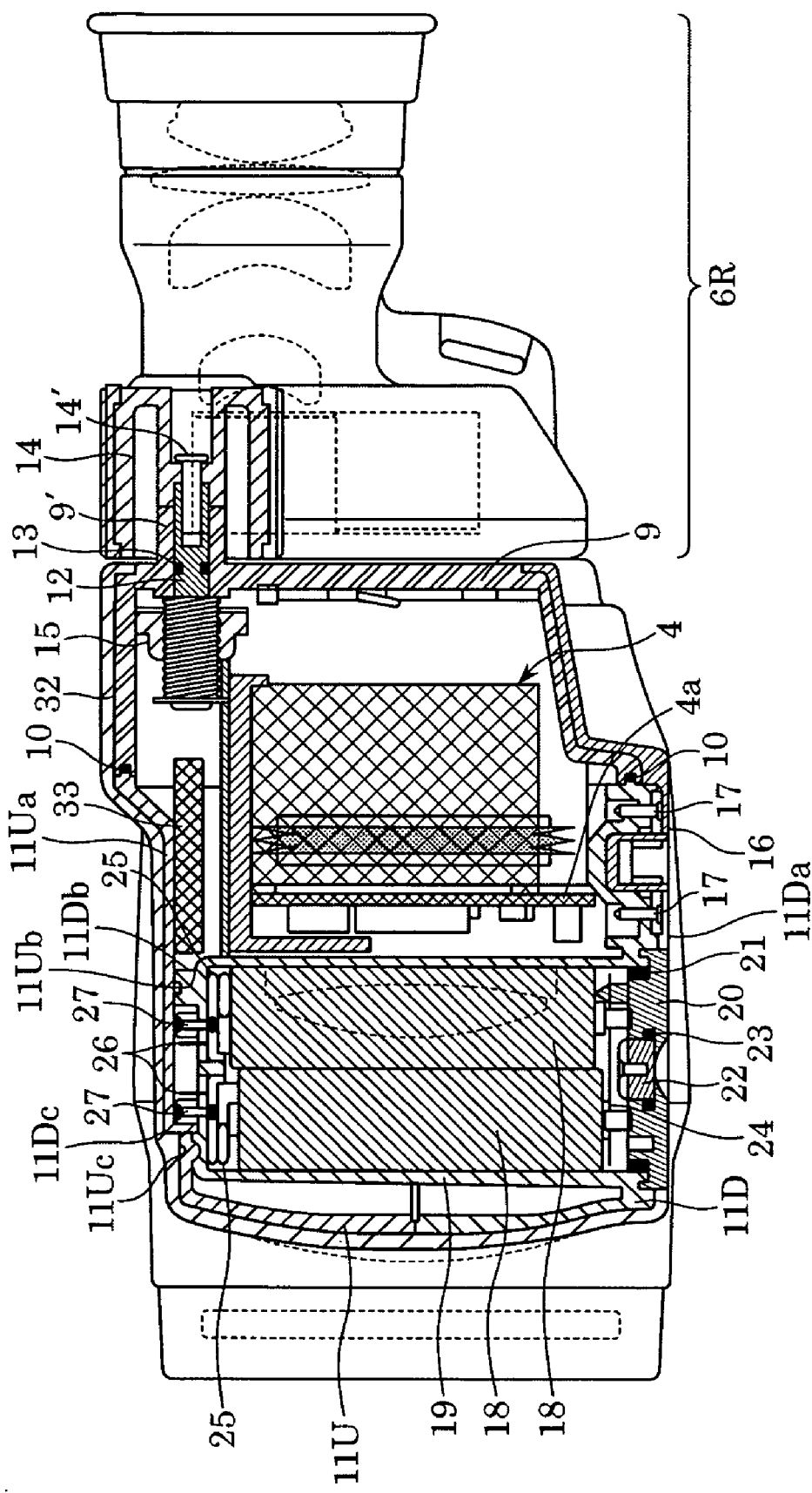
FIG. 2 is a vertical sectional view of the pair of the hermetically sealed binoculars according to the first embodiment of the present invention, viewed from a side face.

An embodiment of the present invention, to which the above structure of the present invention is applied, provides a pair of hermetically sealed vibration-proof binoculars equipped with a waterproof function with a hermetically sealed structure and an image stabilizer (i.e., mechanism for compensating motion blurring) using a Vari-Angle Prism for compensating image blurring. FIG. 1 is a horizontal sectional view of the hermetically sealed binoculars according to the present embodiment, viewed from above. FIG. 2 is a vertical sectional view of the hermetically sealed binoculars according to the present embodiment, viewed from a side face. As will be described below, FIGS. 1 and 2 show an example of binoculars including an absorbent material (absorbent sheet 33) therein. Since this absorbent material can absorb initial water vapor, unlike in normal waterproof binoculars, nitrogen gas need not be used. However, filling nitrogen gas is effective, for example, in preventing mold from growing. According to the hermetically sealed structure of the present embodiment, a plated metal film serving as a gas barrier layer is essentially provided on at least surfaces of the exterior parts exposed to the outside to provide a gas barrier property. The plated metal film is not sufficiently adhered to some inner surfaces of the exterior parts. However, the plated metal film is provided on at least areas exposed to the outside to prevent the permeation of gas in addition to the permeation of liquid.

The specific structure will now be described with reference to FIGS. 1 and 2. Referring to FIGS. 1 and 2, on a pair of right and left objective optical axes 1R and 1L, protective glasses 2R and 2L, which are parallel plates; objective lens units 3R and 3L held with objective lens-barrels 3R' and 3L'; Vari-Angle Prism (hereinafter referred to as VAP) element units 5R and 5L provided in an image stabilizer (mechanism for compensating motion blurring) 4 holding a vibration-proof driving control substrate 4a; and ocular units 6R and 6L are provided in the optical system at the right and the left, from an object in that order.

As shown in FIG. 1, the ocular units 6R and 6L include erecting prism units 7R and 7L and ocular optical systems 8R and 8L at predetermined positions. Each of the ocular units 6R and 6L is held with an ocular base 9 such that each of the ocular units 6R and 6L can be rotated at the home position around the corresponding objective optical axes 1R and 1L. This structure can achieve the following purpose: The optical axes of the ocular optical systems 8R and 8L are disposed at positions shifted from the objective optical axes 1R and 1L in the parallel direction (see FIG. 2) because of the characteristics of the erecting prism units 7R and 7L. The width between the ocular optical systems 8R and 8L can be adjusted to the width between both eyes (not shown) of an observer by rotating the ocular units 6R and 6L respectively. The ocular base 9, which is an exterior part, must precisely hold the ocular units 6R and 6L. The deflection of the ocular base 9 deviates the optical axes of the right and left optical systems. For this reason, the ocular base 9 is composed of aluminum. Since the ocular base 9 is composed of a metal, moisture permeability of this part need not be considered.

The structure of the mechanism of a main body will now be mainly described.

On the front end face of the ocular base 9, a recess is provided around the circumference within the thickness of the end face. A seal ring 10 is disposed in the recess around the circumference in a continuous manner.

Referring to FIG. 2, a fitting hole 9' is provided at the upper part of the rear end plane of the ocular base 9 in the direction parallel to the optical axis. A focusing screw 12 is held in the fitting hole 9' with an O-ring 13 such that the focusing screw 12 can be rotated at the home position in the ocular base 9. A focusing dial 14 is fixed at the rearward of the focusing screw 12 with a screw 14'. A nut 15 is provided in an objective interlocking mechanism (not shown) that concurrently moves the objective lens units 3R and 3L in the optical axis direction. When the focusing dial 14 is rotated, the nut 15 is screwed with a screw portion forming the first half of the focusing screw 12, thereby moving the objective lens units 3R and 3L in the optical axis direction. Thus, the rotation of the focusing dial 14 ultimately moves the objective lens units 3R and 3L in the optical axis direction to achieve the focusing of the binoculars.

The inner spaces of the ocular units 6R and 6L are continuous to the space of the main body at the positions where the ocular units 6R and 6L are held with the ocular base 9. Therefore, O-rings 6R' and 6L' are disposed at the positions holding the ocular units 6R and 6L, seal rings 7R' and 7L' are disposed at the intermediate positions, and O-rings 8R' and 8L' are disposed at the positions holding the ocular optical systems 8R and 8L. Thus, the hermetic seal can be kept at these portions.

An outer cover 11 serving as the main body is composed of a resin and includes a circumferential flange at the rear end thereof. The outer cover 11 is fixed with screws (not shown) from the rearward of the ocular base 9 such that the circumferential flange at the rear end is pressed into contact with the seal ring 10. Thus, the hermetic seal can be kept at this portion. As shown in FIG. 2, the outer cover 11 is composed of an upper outer cover 11U and a lower outer cover 11D. The upper outer cover 11U and the lower outer cover 11D are strongly bonded at the substantially horizontal part to be combined with each other.

Figure 3:
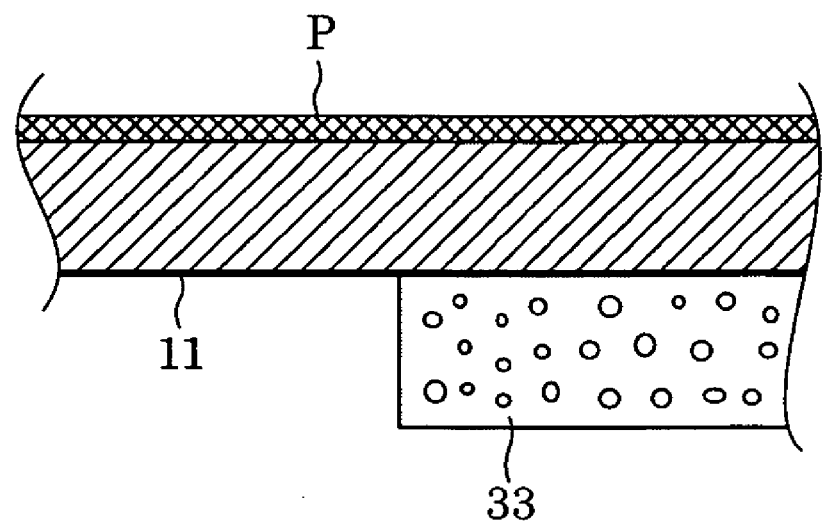
FIG. 3 is a sectional view showing a main body in the first embodiment.

The outer cover 11 is composed of a resin. Therefore, as shown in FIG. 3, a plated metal film P is provided on at least the exterior surface of almost entire area of the outer cover 11 in order to prevent the permeation of gas such as water vapor. (However, the plated metal film is not formed in the vicinity of electrodes 25 to be described below, by masking. Instead, an insulating sealing material is filled in the areas.) At least two metals can be used for the plated metal film.

The upper outer cover 11U includes a planar part 11Ua extending over the upper face. Two protrusive parts 11Ub and 11Uc are provided on the inner face or in the vicinity of the inner face of the planar part 11Ua.

In addition, the absorbent sheet 33 as a predetermined amount of an absorbent material is bonded with, for example, a double-sided adhesive tape at the approximate center of the upper inner face of the upper outer cover 11U (also shown in FIG. 3).

The lower outer cover 11D includes a planar part 11Da extending over the lower face as the planar part 11Ua of the upper outer cover 11U. At the rearward of the planar part 11Da of the lower outer cover 11D, a tripod mount-fixing screw 16 is fixed with a plurality of screws 17. At the front of the planar part 11Da, a battery housing 19 that can hold two batteries 18 is provided upward at the inside of the binoculars. The battery housing 19 is molded as the same part as the lower outer cover 11D. Furthermore, two recesses 11Db and 11Dc are provided at the top so as to engage with the two protrusive parts 11Ub and 11Uc provided on the inner face or in the vicinity of the inner face of the upper outer cover 11U. The recesses 11Db and 11Dc and the protrusive parts 11Ub and 11Uc are strongly bonded with, for example, an adhesive.

The battery housing 19 includes an openable and closable battery cover 20 covering an opening at the lower face. An O-ring 21 is disposed near the periphery of the battery cover 20 so as to be in contact with the opening at the lower face of the battery housing 19. This structure provides the battery housing 19 with waterproofing.

A battery cover-opening and closing dial 22 having an O-ring 23 is provided at the center of the battery cover 20 so that after the batteries 18 are installed, the battery cover 20 can be kept closed. A common electrode 24 being in contact with the two batteries 18 together is provided inside the battery cover 20.

At the innermost part of the battery housing 19, two electrodes 25 are fixed with screws 27 so as to be in contact with the two batteries 18. The electrodes 25 include protrusions 26 for energizing from innermost small holes of the battery housing 19 to the inside. As described above, in the vicinity of the electrodes 25 (for example, an area where the electrodes 25 are in contact with the lower cover and an area including the periphery of the innermost small holes of the battery housing 19 and the screws 27), an insulating sealing material is filled in the space between the protrusions 26 of the electrodes 25 and the innermost small holes of the battery housing 19 so as to maintain the hermetic seal.

A pair of right and left objective frames 28R and 28L is engaged with corresponding leading ends of the outer cover 11. O-rings 29R and 29L are disposed between the objective frames 28R and 28L and the leading ends of the outer cover 11, respectively. Thus, the hermetic seal can be kept at these portions. O-rings 30R and 30L and the protective glasses 2R and 2L, which are parallel plates, are disposed inside the front of the pair of right and left objective frames 28R and 28L. The O-rings 30R and 30L and the protective glasses 2R and 2L are pressed into contact with each other by screwing with a pair of holding rings 31R and 31L. Thus, the hermetic seal can be kept at these portions. A member 32 covers the surface of the outer cover 11 (the surface of a plated metal film P).

The structure and operation of the image-stabilizing function will now be described.

The electricity from the two batteries 18 in the battery housing 19 is led through the corresponding electrodes 25 from the innermost small holes of the battery housing 19 to the inside. The electricity is then supplied to the vibration-proof driving control substrate 4a that is held with the image stabilizer (i.e., mechanism for compensating motion blurring) 4 through, for example, lead wires (not shown).

When an electrical control switch (not shown) for starting the image stabilization turns to an on-state, the operation is performed as follows: The electricity starts conducting and the vibration-proof driving control substrate 4a drives the VAP element units 5R and 5L provided in the image stabilizer 4 so as to perform the image-stabilizing function, while processing a signal from a motion blurring sensor (not shown) such as a vibrating gyroscope disposed on the substrate. When a resin is used in such a mechanism for compensating motion blurring, and in addition, the mechanism includes a unit, it is difficult to remove moisture by, for example, heating. The moistureproof structure of the hermetically sealed binoculars in the present embodiment is more effective in such a case.

As described above, according to the hermetically sealed binoculars of the present embodiment, for example, O-rings, sealing rubbers, and an insulating sealing material are disposed in the spaces formed between the exterior parts to achieve a complete hermetic seal. Furthermore, the battery housing is provided such that upper and lower faces or faces similar to the upper and the lower faces of exterior parts of the hermetically sealed binoculars are connected with each other in the inside. As a result, the battery housing forms a reinforcing part. Accordingly, although the exterior parts are chiefly composed of resin parts, a high strength structure can be achieved. For example, even when a pressure difference is generated between the inside and the outside of the binoculars according to a change in the environment, the deviation of optical axes between the right and the left can be minimized.

The determination of the amount of absorbent sheet 33 will now be described in detail. The absorbent sheet 33 is held at the approximate center of the upper inner face of the upper outer cover 11U and is provided as a predetermined amount of an absorbent material. The binoculars of the present embodiment satisfy the following:

(1) The volume V of the inner space is about 768 $cm^3$.

(2) The weight Mj of resin materials of exterior parts or the like provided in the inside of the outer plated face is as follows. The weight Mj of the exterior parts is about 142 g and the weight Mj of the VAP units is about 50 g. Therefore, the total weight Mj is about 192 g. Accordingly, when the moisture absorptivity of a normal resin is about 0.2%, the amount of water retention is expressed as Mj×0.002=0.384 g.

(3) It is assumed that the assembly is performed at 25° C. and at a humidity of 50%. Under this environment, when air having a volume of Item (1) is sealed, the amount of water retention in the air is about 0.009 g, according to a known calculation formula.

(4) Consequently, the estimated amount Mt of water retention inside the plated face is expressed as (2)+(3)=0.393 g.

(5) Zeosheet (trade name) (from Shinagawa Chemicals Co., Ltd., moisture absorptivity 17%) is used as the absorbent sheet 33. The weight corresponding to Item (4) is calculated as follows: 0.393÷0.17→2.31 g In other words, in the present embodiment, the estimated amount of water retention inside the main body is defined as the above Mt. The amount Mt is the total of the following two weights: (i) zero point two percent of the weight of resins used inside the hermetically sealed space and the wall surfaces of the hermetically sealed space of the main body (in order to simplify the calculation, it is estimated that 0.2% of the total weight of the resins is equal to the amount of released water) and (ii) the water content in air at 25° C. and at a humidity of 50%, the air having a volume of the inner space of the main body. The absorbent sheet (absorbent material) used in the present embodiment can absorb the amount of water larger than or equal to the amount of water retention described above, and at least 1.2 times of the amount of water retention, and further, at least 1.5 times of the amount of water retention.

In the above case, it is sufficient that at least 2.31 g of the absorbent sheet 33, which is calculated according to Item (5), is used. Thus, in the binoculars of the present embodiment, all the amount of water retention inside the plated metal film, which is a gas barrier film for preventing the permeation of moisture-containing gas, can be absorbed. Therefore, the filling of nitrogen gas for the purpose of removing moisture can also be omitted. An appropriate weight exceeding the above weight is determined as the actual weight of the absorbent sheet 33. As described above, when the margin of safety is 1.2 times, 2.31×1.2→2.77 g or more of Zeosheet (trade name) (a water retention material or an absorbent material) is used.

According to the moistureproof structure of the hermetically sealed binoculars in the present embodiment, the exterior parts are composed of a resin, an impermeable film is provided on at least outer surfaces of the exterior parts by plating, and an absorbent material is disposed in the optical device, the absorbent material having a moisture absorptive capacity of at least estimated amount of water retention inside the plated parts. Therefore, a light-weight and inexpensive hermetically sealed optical device can be provided. In particular, the production process does not require the filling of, for example, nitrogen gas or dry air with low humidity, which requires a special apparatus. Accordingly, the production and the maintenance can be performed more simply.

Second Embodiment

A second embodiment of the present invention will now be described.

Figure 4:
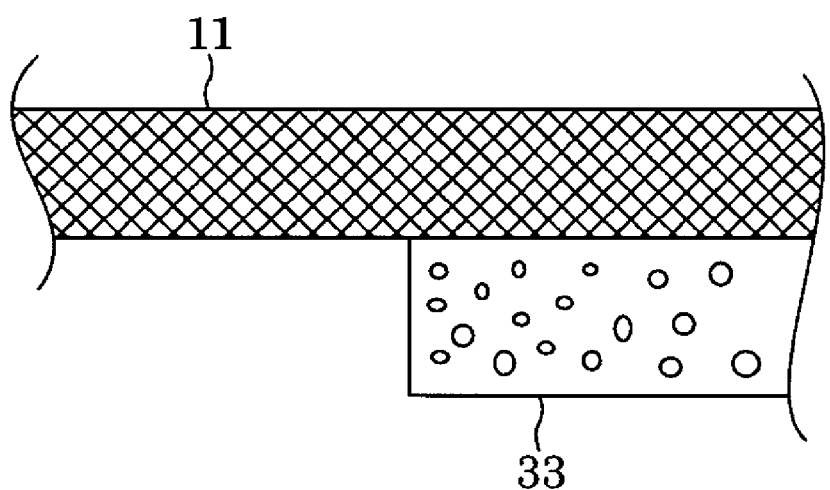
FIG. 4 is a sectional view showing a main body in a second embodiment.

Hermetically sealed vibration-proof binoculars of the second embodiment have the same shape as that in the first embodiment. The binoculars of the second embodiment have a waterproof function with a hermetically sealed structure and an image stabilizer using the Vari-Angle Prism for compensating image blurring. As shown in FIG. 4, an outer cover 11 forming an exterior part exposed to the outside air is composed of a metal. An absorbent sheet 33 is bonded inside the outer cover 11.

The shape, the structure, and the like that are the same as those in the first embodiment are not described.

In the second embodiment, however, the structure of the outer cover 11 forming the main body is different from that of the first embodiment. Predetermined values in the binoculars of the present embodiment will now be described according to the predetermined values shown in Items (1) to (5) in the first embodiment.

(6) The volume V of the inner space is about 768 cm$^3$.
(7) Since the exterior parts are composed of a metal, it is assumed that the exterior parts do not retain water. The weight of resin material used in the VAP units disposed inside the device is about 50 g. Accordingly, when the moisture absorptivity of a normal resin is 0.2%, the amount of water retention is 0.1 g.
(8) Under the same environment in the assembly as that in the first embodiment, the amount of water retention in the air is about 0.009 g.
(9) Consequently, the estimated amount of water retention inside the device is expressed as (7)+(8)=0.109 g.
(10) Zeosheet (trade name) (from Shinagawa Chemicals Co., Ltd., moisture absorptivity 17%) is used as the absorbent sheet 33. The weight corresponding to Item (9) is calculated as follows: 0.109÷0.17→0.64 g Accordingly, it is sufficient that at least 0.64 g of the absorbent sheet 33, which is calculated according to Item (10), is used. Thus, the amount of water retention inside the binoculars of the present embodiment can be absorbed. When the margin of safety is 1.2 times, 0.64×1.2→0.77 g or more of the absorbent sheet 33 is used.

According to the second embodiment using a metal as the main body, since the amount of water retention is about 1/3.6 of that in the first embodiment, the dimension of the absorbent sheet can be advantageously reduced.

According to the known optical devices such as binoculars, exterior parts are composed of a metal, and in addition, nitrogen gas is filled in the devices in order to form a moistureproof structure. In such a case, although initial moisture can be removed, the moisture contained in, for example, the inner resin, which is described in Item (2) or (7), cannot be absorbed. In contrast, according to the present embodiment, since the absorbent sheet having an appropriate water absorptive capacity is provided in the inner space, water can be removed more simply and at lower cost, compared with the known optical devices.

Third Embodiment

A third embodiment of the present invention will now be described.

Figure 5:
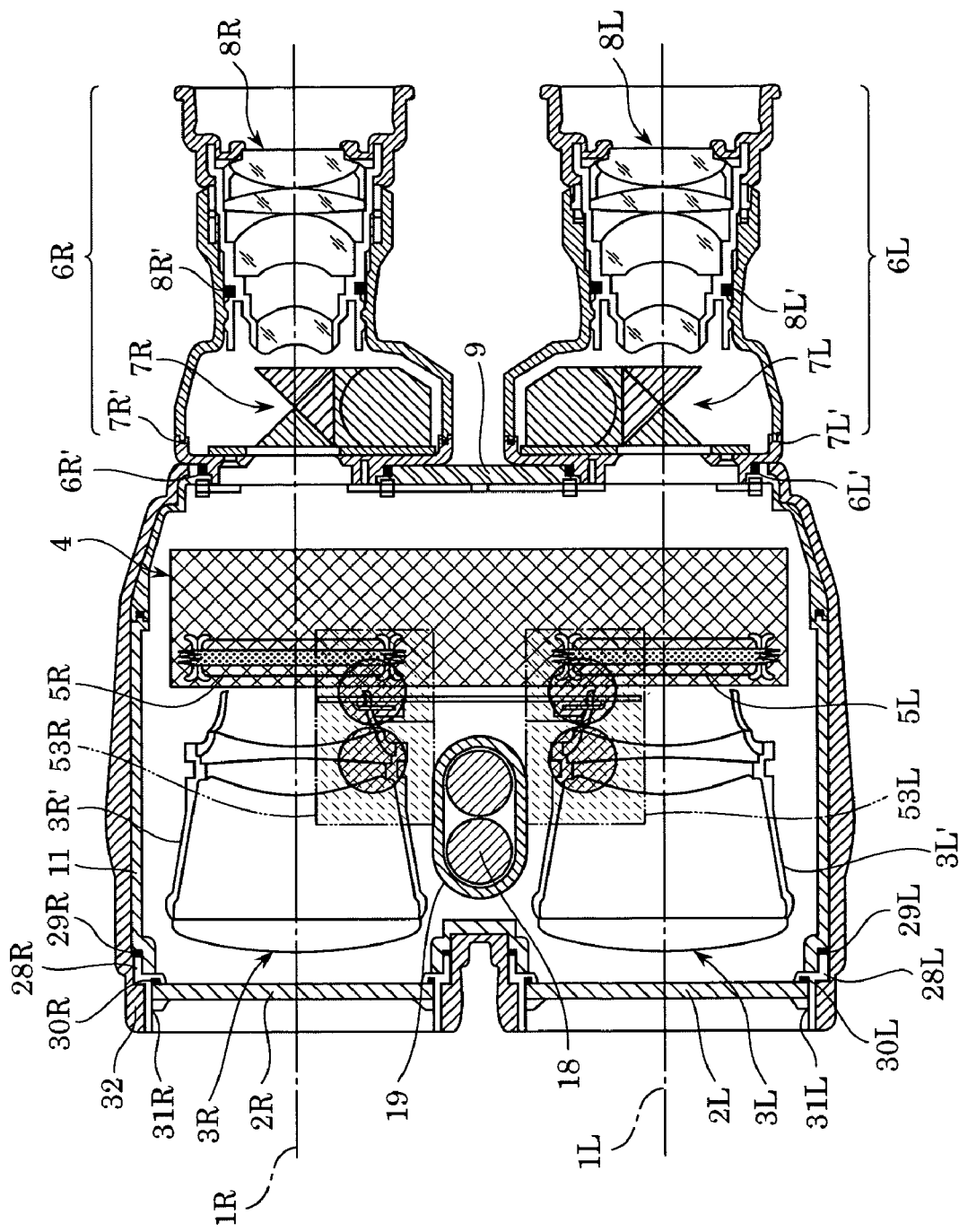
FIG. 5 is a horizontal sectional view of a pair of binoculars of a third embodiment, viewed from above.

FIG. 5 is a view showing hermetically sealed vibration-proof binoculars of the third embodiment. In the third embodiment, the same components as those in the first embodiment in FIG. 1 have the same reference numerals and repeated descriptions are omitted.

In the binoculars of the third embodiment, absorbent sheets 53R and 53L are fixed by bonding inside the outer cover 11, which is the main body, along the pair of right and left objective optical axes 1R and 1L. The total moisture absorptive capacity of the two absorbent sheets 53R and 53L is equal to that of the absorbent sheet 33 used in the first embodiment.

Fourth Embodiment

A fourth embodiment of the present invention will now be described.

Figure 6:
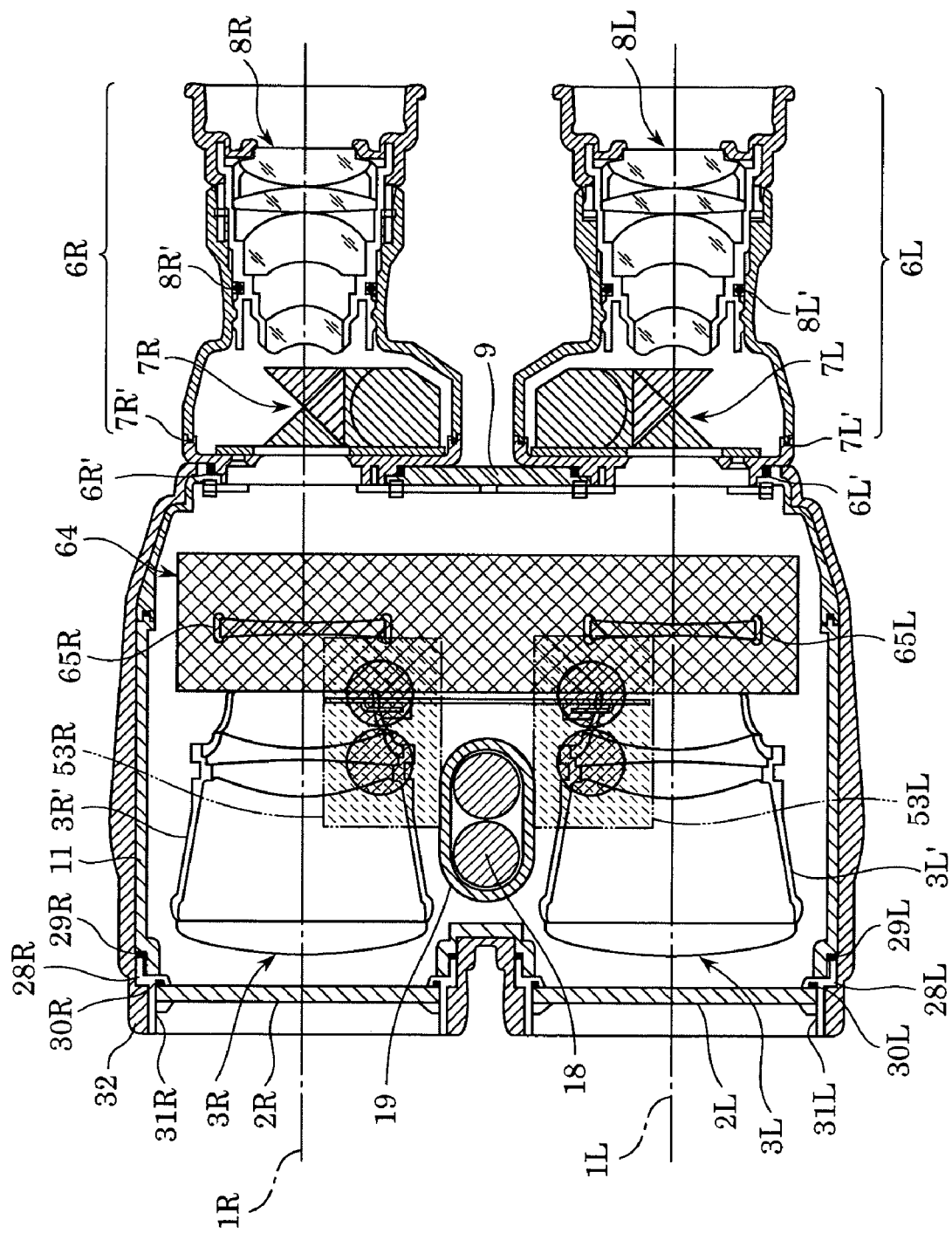
FIG. 6 is a horizontal sectional view of a pair of binoculars of a fourth embodiment, viewed from above.

FIG. 6 is a view showing hermetically sealed vibration-proof binoculars of the fourth embodiment. In the fourth embodiment, the same components as those in the third embodiment in FIG. 5 have the same reference numerals and the repeated descriptions are omitted.

In the binoculars of the fourth embodiment, shift lens units 65R and 65L are used in an image stabilizer (mechanism for compensating motion blurring) 64. Motion blurring is compensated by shifting or tilting motion of the shift lens units 65R and 65L. In the binoculars of the fourth embodiment, as in the third embodiment, absorbent sheets 53R and 53L are fixed by bonding inside the outer cover 11, which is the main body, along the pair of right and left objective optical axes 1R and 1L.

Fifth Embodiment

A fifth embodiment of the present invention will now be described.

Figure 7:
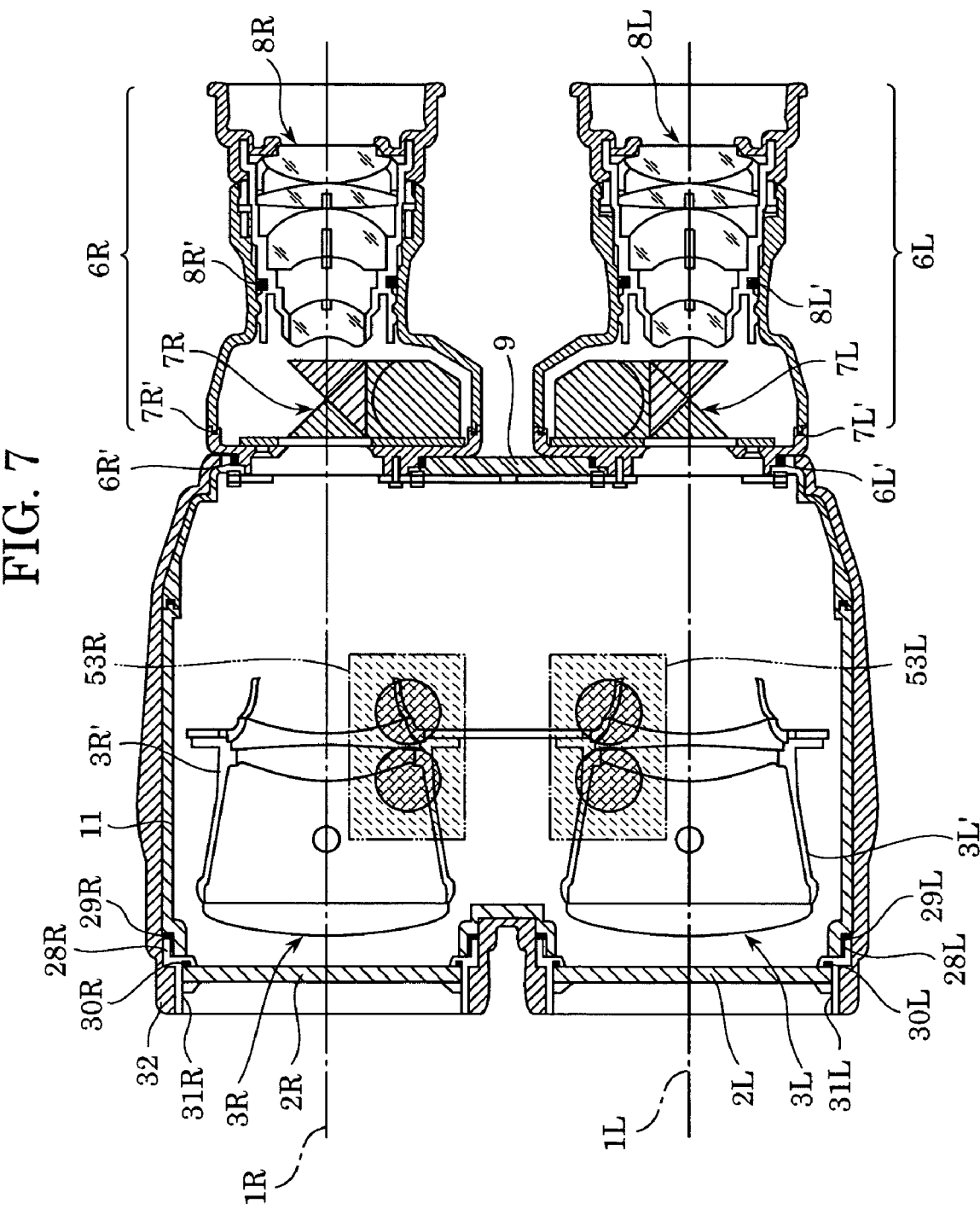
FIG. 7 is a horizontal sectional view of a pair of binoculars of a fifth embodiment, viewed from above.

FIG. 7 is a view showing hermetically sealed binoculars of the fifth embodiment. In the fifth embodiment, the same components as those in the fourth embodiment in FIG. 6 have the same reference numerals and the repeated descriptions are omitted.

The binoculars of the fifth embodiment do not include an image stabilizer (mechanism for compensating motion blurring). In the binoculars of the fifth embodiment, as in the fourth embodiment, absorbent sheets 53R and 53L are fixed by bonding inside the outer cover 11, which is the main body, along the pair of right and left objective optical axes 1R and 1L.

According to the above embodiments, a light-weight and low-cost moistureproof optical device that allows for simple maintenance can be achieved.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application Nos. 2004-129965 filed Apr. 26, 2004, and 2005-040677 filed Feb. 17, 2005, which are hereby incorporated by reference herein.

What is claimed is:

1. A binocular, comprising:

a pair of transparent cover optical elements;

a main body having an inside and a synthetic resin, wherein an exterior surface of the main body includes a gas barrier layer including a plated layer;

a pair of objective optical elements disposed in the main body, each of the objective optical elements receiving light from the corresponding transparent cover optical element, the objective optical elements moving in an optical axis direction so as to perform a focusing operation;

a pair of blurring compensation optical elements disposed in the main body, each of the blurring compensation optical elements receiving light from the corresponding objective optical element, the blurring compensation optical elements displacing such that an emission optical axis differs in relation to an incident optical axis:

a pair of ocular units held by the main body, the main body and the ocular units being air-tightly connected, each of the ocular units including:

an upright optical element receiving light from the corresponding blurring compensation optical element; and an ocular optical element leading light from the upright optical element; and an absorbent member disposed in the main body, the absorbent member being fixed on an upper surface of the main body, wherein the absorbent member has a moisture absorptive capacity corresponding to at least an amount of water retention inside the main body.

2. The binocular according to claim 1, wherein the absorbent member includes two absorbent members.

3. The binocular according to claim 1, wherein the absorbent member has the moisture absorptive capacity corresponding to at least double the amount of water retention inside the main body.

4. The binocular according to claim 1, wherein the absorbent member has the moisture absorptive capacity corresponding to at least an amount of water retention inside the gas barrier layer.

5. The binocular according to claim 1, wherein the main body includes a metal.

* * * * *